June 9, 1959 R. C. BAECHLER 2,890,076
AUTOMATIC EQUALIZING IMPACT REAR TRUCK BUMPER DEVICE
Filed Oct. 21, 1955 2 Sheets-Sheet 1
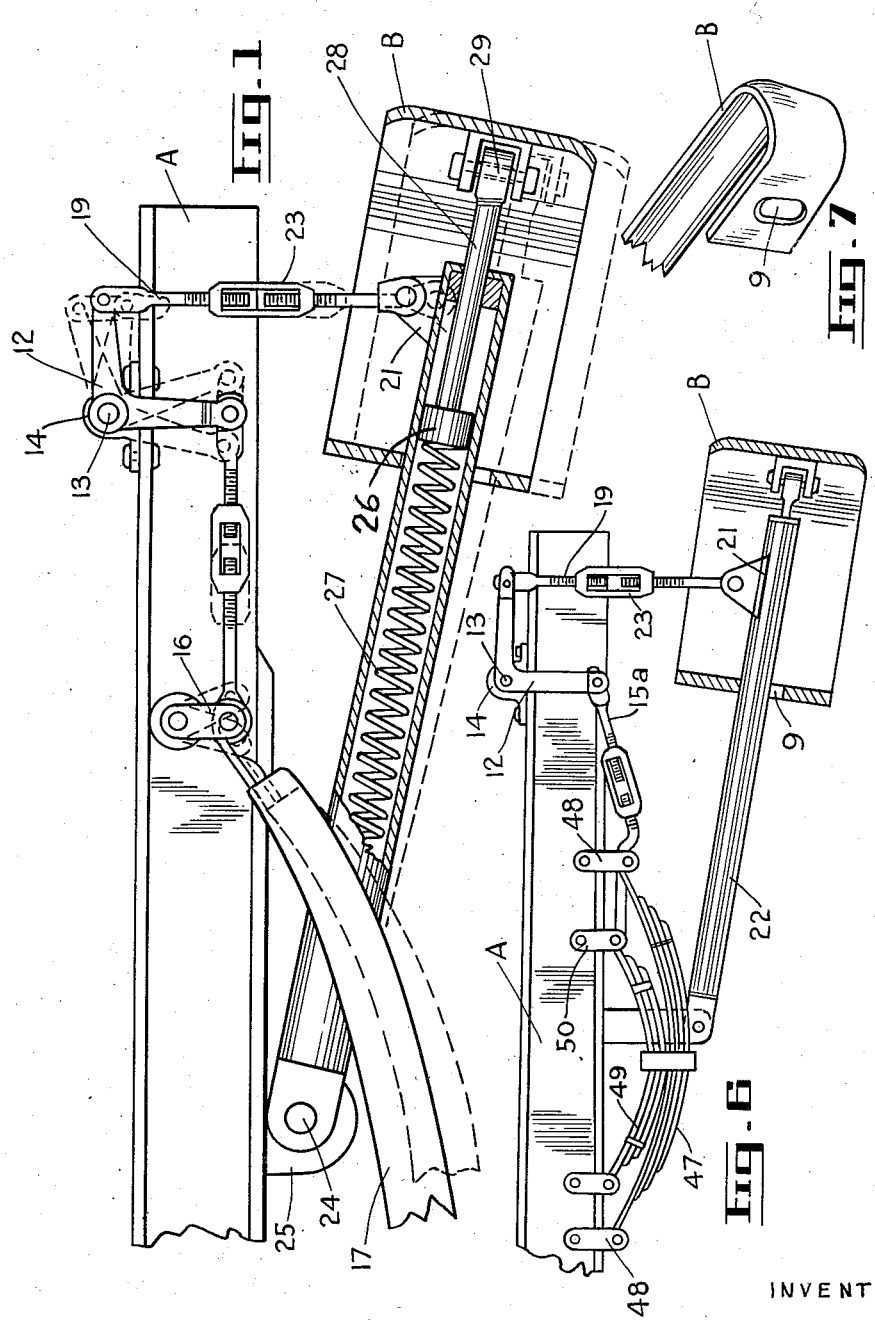
INVENTOR
Robert C. Baechler
Ralph Burch
Attorney June 9, 1959 R. C. BAECHLER 2,890,076
AUTOMATIC EQUALIZING IMPACT REAR TRUCK BUMPER DEVICE
Filed Oct. 21, 1955 2 Sheets-Sheet 2
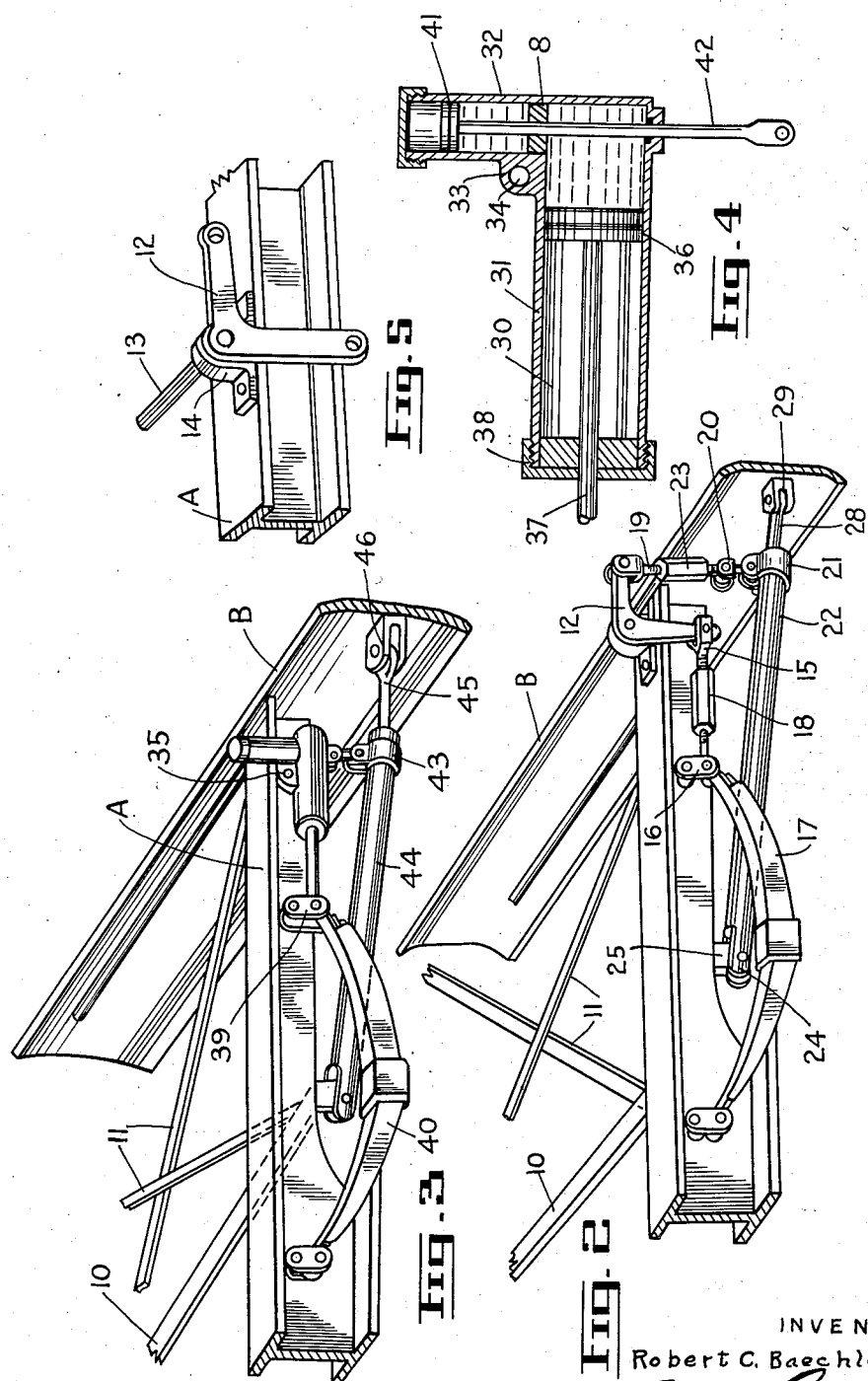
INVENTOR
Robert C. Baechler
Attorney

United States Patent Office 2,890,076
Patented June 9, 1959

2,890,076

AUTOMATIC EQUALIZING IMPACT REAR TRUCK BUMPER DEVICE

Robert C. Baechler, Atikokan, Ontario, Canada

Application October 21, 1955, Serial No. 541,991

1 Claim. (Cl. 293—90)

This invention relates to automatically controlled bumpers for automobiles or like vehicles.

Bumpers are installed on vehicles primarily to absorb the shock of impact with other vehicles and safeguard the vehicles from damage.

It has been found that bumpers which are rigidly mounted on a vehicle fail to give the protection for which they were originally designed and one of the causes of this is that the height of the bumpers from the road surface differs and fluctuates with the load carried by the vehicle.

It is not uncommon to see automobiles in contact with their bumpers interlocked due to the bumper of one vehicle riding over the bumper of the adjacent vehicle and the vehicles are only disengaged after the body of one vehicle is moved up or down relatively to the other to liberate the bumpers. This interlocking of bumpers may result in damage to the body of one or both of the vehicles.

Automobiles of different makes have a similarity of form and in an endeavor to obviate the frequent interlocking of bumpers and also to protect the vehicles generally, the bumpers are formed with vertically disposed spaced guards or with upwardly extending rails which form a guard for the radiator of the vehicle.

These guards frequently become loose or even detached or displaced and so fail to give the protection for which they were designed and often fail to perform any useful function.

These are some of the problems I encountered when making my invention.

From a careful study of the above drawbacks I have come to the conclusion that certain objects must be obtained before a serviceable bumper useful on all occasions could be made.

The principal object of my invention is that an automatically controlled bumper should be positioned on a vehicle at a desired height above the road surface and maintained at that height irrespective as to whether the vehicle is lightly or fully loaded. Another object is that the position of the bumper should be automatically controlled by the flexure of the vehicle springs.

A further object is that the means for maintaining the bumper at the desired height should be pivotally mounted on the vehicle to compensate for the obliquity of the working parts during the movement of the bumper.

Still another object is that while the bumper is relatively floating it is positively secured to the frame or chassis of the vehicle so that it will take up the impact of collision with another vehicle or obstacle.

A further object is to provide resilient means between the frame or chassis of the vehicle and the bumper to reduce jarring or impact on the vehicle body.

In the attaining of these objects I have produced a strong and durable device which will adequately perform all the functions required of it and in which the several parts are readily accessible for inspection or repair.

So that the nature of my invention will be clearly understood I have illustrated and described two embodiments of the same, but it will be understood that I do not limit myself to the specific construction disclosed but reserve the right to modify or alter the structure of my device within the scope of the appended claims.

In the drawings:

Figure 1 is a fragmentary side elevation of part of the vehicle frame showing my automatically controlled bumper mounted thereon part of the mechanism being in section;

Figure 2 is a fragmentary perspective view of part of the vehicle frame showing my automatically controlled bumper mounted thereon with the diagonal struts connecting the bumper with the vehicle frame;

Figure 3 is a fragmentary perspective view of a vehicle frame showing an alternative form of automatic control for the bumper and the diagonal struts connecting the bumper with the vehicle frame;

Figure 4 is an enlarged longitudinal sectional elevation of the hydraulic cylinder illustrated in Figure 3;

Figure 5 is a fragmentary perspective view of a part of a vehicle frame showing the means for pivotally attaching the bell crank to the frame;

Figure 6 is a fragmentary side elevation of part of a vehicle frame showing my automatically controlled bumper when actuated by a main semi-elliptical spring and auxiliary spring;

Figure 7 is a fragmentary perspective view of one end of the bumper which wraps around the vehicle.

Like characters of reference refer to like parts in the several figures.

Referring to the drawings A represents part of the frame of a vehicle and B represents the bumper. The frame A is provided with a transversely extending bar 10 which is connected to the bumper B by a pair of diagonally arranged struts 11. The struts are pivotally connected to the bar 10 and bumper B so that, while they do not retard the vertical movement of the bumper, they transmit and distribute any shock of impact on the bumper to the frame of the vehicle.

The vertical movement of the bumper B is controlled by mechanism mounted on the walls of the frame of the vehicle but as the mechanisms are similar and complementary, the mechanism on one wall of the frame only is illustrated since to illustrate and describe the mechanisms on both walls of the frame would only add to prolixity in this specification.

Vertical movement is transmitted to the bumper B by the bell-crank 12 mounted on the rod 13 which is journalled in the bearing 14 carried by the frame A. The vertical arm of the bell crank 12 is connected by the adjustable link 15 with the shackle 16 of the semi-elliptical spring 17, and as the vehicle is loaded or unloaded the spring will be flexed and so transmit motion through the link 15 to the vertical arm of the bell crank and so rock the bell crank 12.

The link 15 is constructed in two portions adjustably connected by a turn buckle 18 so that the length of the link may be adjusted if and when desired.

The horizontal arm of the bell crank 12 is connected to the upper end of the adjustable link 19, the lower end of the link being connected to a double yoke 20 which is pivotally attached to the clamp 21 which embraces one end of the inclined cylinder 22.

The double yoke allows the necessary yield to the link connection as the bell crank 12 is rocked.

The link 19 is formed in two parts operatively connected by a turn buckle 23 so that the length of the link may be adjusted when required.

The end of the cylinder 22 remote from the clamp 21 is pivotally attached at 24 to the bracket 25 on the frame A. A piston 26 is slidably mounted in the cylinder 22 and a helical spring 27 is in the cylinder between the piston 26 and the upper end of the cylinder. The piston rod 28 projects beyond the lower end of the cylinder 22 and is pivotally attached at 29 to the bumper B.

This bumper has its ends turned around the adjacent part of the vehicle frame A as shown in Figures 1 and 7 and the turned end is formed with an orifice 9 which embraces the outer periphery or wall of the cylinder 22.

The movement of the semi-elliptical spring 17, the shackle 16, link 15, bell crank 12, link 19, cylinder 22, and the bumper B are shown in the dotted lines in Figure 1 which clearly illustrate the manner in which the bumper B is elevated or lowered.

In Figure 3 I have illustrated an alternative form of mechanism to that shown in Figures 1 and 2 in that the bell crank 12 is replaced by a hydraulic cylinder 30 which has somewhat the form of a right angle as is clearly shown in the longitudinal section illustrated in Figure 4. This cylinder 30 is formed with a horizontal cylindrical portion 31 and an end vertical portion 32 which has a smaller diameter than the portion 31.

This hydraulic cylinder 30 is provided at the junction of the horizontal and vertical cylindrical portions 31 and 32 with a bracket 33 having an orifice 34 therethrough, and a pin 35 extends through this orifice and is attached to the frame A of the vehicle.

A piston 36 is slidably mounted in the horizontal cylinder 31 and a piston rod 37 extends through the cylinder cover 38 and is operatively connected to the shackle 39 of the semi-elliptical spring 40.

Slidably mounted in the vertical cylinder 32 is a piston 41 which is connected by a piston rod 42 with the clamp 43 which surrounds the outer wall of the inclined cylinder 44 in which a spring controlled piston is slidably mounted and this piston is connected to one end of a piston rod 45 which projects beyond the lower end of the cylinder 44 and is connected at 46 with the bumper B.

The cylinder 44 with its co-acting spring controlled piston is similar to that described above with reference to Figures 1 and 2.

The piston rod 42 is provided intermediate of its length with a disc 8 for an object to be made clear hereafter.

The body of the horizontal cylinder 31 and the vertical cylinder 32 between the pistons 36 and 41 is filled with oil.

Attention is now directed to Figure 6 in which a vehicle is provided with a semi-elliptical main spring 47 which is attached by shackles 48 to the frame A and an auxiliary semi-elliptical spring 49 is superposed on the main spring and attached by shackles 50 to the frame A.

In this instance the adjustable link 15a has one end offset to pass the shackle 48 of the main spring 47 and is operatively connected with the shackle 50 of the auxiliary spring.

The bell crank 12, link 19, cylinder 22, and bumper B are all similar to those already described in Figures 1 and 2, and need not be enlarged upon.

When my adjustable bumper B is mounted on a vehicle which is not loaded or only slightly loaded then the shackle 16 is in the position to the left of the perpendicular line through the shackle and the spring 17 is in the dotted position shown in Figure 1. In this position the bell crank 12 has been rotated in a clockwise direction so that the vertical arm is to the left of the perpendicular position and the horizontal arm is in the lower dotted position.

This brings the bumper B into the lower position shown by the dotted lines so that the bumper is now in the desired position above the road surface.

When the vehicle is loaded then the spring 17 is flexed swinging shackle 16 to the right hand position as shown in Figure 1. This swing of the shackle rotates the bell crank 12 in an anti-clockwise direction bringing the vertical arm to the right hand dotted position and the horizontal arm of the bell crank is inclined upwardly thereby raising the link 19 and bumper B into its upper highest position, and the bumper is now at the desired constant height above the road surface.

It will be clear that the bumper B automatically assumes a position of constant fixed height above the road surface as the body of the vehicle moves up or down under its load, the bumper B being moved in unison with the load movement of the vehicle and automatically maintains at all times a constant desired height above the road surface.

Should the bumper B be struck by another vehicle, the backward force of the bumper causes the piston rod 28 and piston 26 to move inwardly into the cylinder 22 and the helical spring 27 is compressed and resists and reduces the force of the impact. When the force of the impact is spent then the bumper B returns to its normal position under the action of the spring 27.

It should be noted that the arms of the bell crank 12 are so proportioned in length that the movement of the vertical arm will rotate the horizontal arm to the desired extent to impart a lifting or lowering movement to the bumper B.

When the devices shown in Figures 3 and 4 are mounted on a vehicle, then the swing of the shackle 39 will transmit motion to the piston rod 37 and piston 36 so that the oil in front of the piston is forced towards the opposite end of the cylinder.

As the volume of oil in the cylinder is constant, any movement of the oil forward will force the piston 41 upwardly in the cylinder 32 so transmitting motion through the piston rod 42 to rotate the cylinder 44 upwardly and in this way the bumper is moved to the desired position.

As the piston 36 moves in the direction of the spring 40 then the oil in the cylinder 32 passes back into the cylinder 31 allowing the piston 41 to descend in the cylinder 32 and motion is transmitted through the piston rod 42 to lower the cylinder 44 and so lower the bumper B.

The pivotal mounting of the cylinder 30 on the pin 35 permits the cylinder 31 to be aligned with the piston 36 and the piston rod 37.

It will be observed that the vertical cylinder 32 is of smaller diameter than the cylinder 31 so that a small movement of the piston 36 imparts or permits a relatively large movement of the piston 41 and piston rod 42.

The provision of a disc 8 on the piston rod 42 prevents too rapid a movement of the piston 41 and piston rod 42 so that the motion transmitted to the bumper B will be smooth and without jarring.

The device illustrated in Figure 6 showing the main spring 47 and auxiliary or helper spring 49 functions in the same manner as that shown in Figures 1 and 2 so that further description appears to be unnecessary.

From the above description it will be clear that I have invented a bumper control mechanism which will automatically maintain the bumper in a floating position at a constant level above the road surface under all operative conditions of the vehicle on which it is mounted.

I claim:

A device of the character described comprising a vehicle frame, springs supporting said frame, pivoted shackles connecting said springs to said frame, a bumper, an arm pivotally suspending said bumper from said frame for vertical movement, a bell crank lever pivotally mounted on said frame, means connecting one end of said lever with the shackle of said spring for operating said lever upon movement of the shackle and means connecting the other end of said lever with said arm for raising and lowering the arm upon operation of said lever.

References Cited in the file of this patent

UNITED STATES PATENTS

| | | |
|---|---|---|
| 908,561 | Grof | Jan. 5, 1909 |
| 1,034,125 | Leclerc et al. | July 30, 1912 |
| 1,200,169 | Close | Oct. 3, 1916 |
| 1,486,660 | Hajdu | Mar. 11, 1924 |
| 1,489,336 | Wilkinson | Apr. 8, 1924 |

FOREIGN PATENTS

| | | |
|---|---|---|
| 244,236 | Italy | Jan. 28, 1926 |